US008677238B2

(12) United States Patent
Nicholson

(10) Patent No.: US 8,677,238 B2
(45) Date of Patent: Mar. 18, 2014

(54) NAVIGATION OF ELECTRONIC DEVICE MENU WITHOUT REQUIRING VISUAL CONTACT

(75) Inventor: Charles Nicholson, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 553 days.

(21) Appl. No.: 12/909,676

(22) Filed: Oct. 21, 2010

(65) Prior Publication Data
US 2012/0102399 A1     Apr. 26, 2012

(51) Int. Cl.
G06F 3/01     (2006.01)
G06F 3/16     (2006.01)
G06F 3/033    (2013.01)

(52) U.S. Cl.
USPC ............................ 715/702; 715/728; 715/863

(58) Field of Classification Search
USPC ........................................ 715/702, 864, 865
See application file for complete search history.

(56) References Cited

U.S. PATENT DOCUMENTS

| | | | |
|---|---|---|---|
| 2007/0117080 A1* | 5/2007 | Hsi ............................... | 434/319 |
| 2009/0047022 A1* | 2/2009 | Newman et al. ............... | 398/106 |
| 2009/0166098 A1* | 7/2009 | Sunder ........................ | 178/18.04 |
| 2009/0167704 A1 | 7/2009 | Terlizzi et al. | |
| 2010/0169097 A1 | 7/2010 | Nachman et al. | |
| 2011/0053577 A1* | 3/2011 | Lee et al. ...................... | 455/418 |
| 2011/0163860 A1* | 7/2011 | Ryu et al. .................... | 340/407.2 |

FOREIGN PATENT DOCUMENTS

WO     2008134657 A2     11/2008
WO     WO 2008/134657 A2     11/2008

OTHER PUBLICATIONS

Notification of Transmittal of the International Search Report and Written Opinion of the International Searching Authority, or the Declaration for PCT/US2011/051951, mailed on Dec. 28, 2011, pp. 12 total.
PCT International Search Report and Written Opinion of the International Searching Authority (ISA) issued in International Application No. PCT/US2011/051951, The International Bureau of WIPO, May 2, 2013.

* cited by examiner

*Primary Examiner* — Weilun Lo
*Assistant Examiner* — Truc Chuong
(74) *Attorney, Agent, or Firm* — Martine Penilla Group, LLP

(57)     ABSTRACT

Methods, systems, and computer programs for controlling a device without requiring visual contact are presented. One method includes an operation for identifying available options for a user according to a state of a program executing on a device, where the available options correspond to possible menu items. Further, the method provides an audible output of the available options and the detection of a touch-based input, where the input is received at the device without providing an identifiable visual cue to the user. Further yet, the method includes operations for determining the selected option from the available options based on the timing of the input relative to the audible output, and for performing the selected option by the computer program. In another method, the options are presented to the user via different vibration patterns or via vibrations of a second device connected to the device.

12 Claims, 13 Drawing Sheets

NAVIGATION OF ELECTRONIC DEVICE MENU WITHOUT REQUIRING VISUAL CONTACT

BACKGROUND

1. Field of the Invention

The present invention relates to methods for controlling an electronic device, and more particularly, methods, systems, and computer programs for interacting with an electronic device where the user is not required to look at the portable device for cues.

2. Description of the Related Art

The functionality of mobile devices has seen many advances in recent years, and such advances have produced a multitude of products and services. Portable electronic devices, such as mobile phones and smart phones, are ubiquitous in our society and users carry the devices almost everywhere.

In certain situations, the use of a portable device may be difficult, inconvenient, or unacceptable. For example, when the user is in a business meeting it may be unacceptable to reach for the mobile phone when an incoming call is received. The use of silent modes and vibrating alarms allow the user to carry the phone everywhere without disturbing others while still be notified of incoming calls or messages.

In other cases, the user may not be able to pay full attention to an incoming message because the user is in the middle of an activity that cannot be interrupted, such as driving. The driver must keep her eyes on the road and diverting the gaze of the driver to the portable device, even for a second, could have serious consequences.

Thus, users may be in situations where the users need to use the mobile phone in a discrete way without others around noticing, or to use the mobile phone without having to look at the mobile phone.

It is in this context that embodiments of the invention arise.

SUMMARY

Embodiments of the present invention provide methods, systems, and computer programs for controlling a device without requiring visual contact with the device. It should be appreciated that the present invention can be implemented in numerous ways, such as a process, an apparatus, a system, a device or a method on a computer readable medium. Several inventive embodiments of the present invention are described below.

In one embodiment, a method includes an operation for identifying available options for presentation to a user according to a state of a computer program executing on a portable device, where the available options belong to a plurality of possible menu items. Further, the method provides an audible output of the available options to the user and detection of a touch-based input by the portable device, where the input is received at the portable device without providing an identifiable visual cue to the user. Further yet, the method includes operations for determining the selected option from the available options based on the timing of the input relative to the audible output, and for performing the selected option by the computer program.

In another embodiment a method is presented for controlling a portable device. The method includes an operation to identify available options for presentation to a user according to a state of a computer program executing on the portable device. The available options belong to a plurality of possible menu options. Further, the portable device is vibrated to cue the user to select one of the available options. Another operation is for detecting a user input by the portable device or by a device connected to the portable device, where the user input is received at the portable device without providing an identifiable visual cue to the user. Further, the method determines which option from the available options was selected based on the timing of the vibrating of the portable device and the timing of the user input. The selected option is then performed by the computer program.

In another embodiment, a portable device includes a memory, a processor, a vibrating module, and a touchscreen. The memory includes a computer program, and the processor executes the computer program. The processor also identifies available options for presentation to a user according to the state of the computer program, where the available options belong to a plurality of possible menu options. The vibrating module causes the portable device to vibrate in order to cue the user for selecting one of the available options. The touchscreen is sensitive to touch and is defined to detect user input. In the portable device, the processor determines which option from the available options was selected based on timing of the vibrating of the portable device and timing of the user input, and the processor performs the option that was selected. The user input is received at the portable device without providing an identifiable visual cue to the user.

In yet another embodiment, a computer program embedded in a non-transitory computer-readable storage medium, when executed by one or more processors, controls a portable device. The computer program includes program instructions for identifying available options for presentation to a user according to a state of a computer program executing on a portable device, where the available options belong to a plurality of possible menu items. Further, the computer program includes program instructions for providing an audible output of the available options to the user and detection of a touch-based input by the portable device, where the input is received at the portable device without providing an identifiable visual cue to the user. Further yet, program instructions determine the selected option from the available options based on the timing of the input relative to the audible output, and perform the selected option.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, systems, and computer programs for controlling a device without requiring visual contact with the device. One method includes an operation for identifying available options for presentation to a user according to a state of a computer program executing on a portable device, where the available options belong to a plurality of possible menu items. Further, the method provides an audible output of the available options to the user and detection of a touch-based input by the portable device, where the input is received at the portable device without providing an identifiable visual cue to the user. Further yet, the method includes operations for determining the selected option from the available options based on the timing of the input relative to the audible output, and for performing the selected option by the computer program. In another method, the options are presented to the user via different vibration patterns of an electronic device or via vibrations of a second device connected to the electronic device.

It will be obvious, however, to one skilled in the art, that the present invention may be practiced without some or all of these specific details. In other instances, well known process operations have not been described in detail in order not to unnecessarily obscure the present invention.

Figure 1:
FIG. 1 illustrates a user navigating options in a user device without making visual contact with the device, according to one embodiment.

FIG. 1 illustrates a user navigating options in a user device without making visual contact with the device, according to one embodiment. While on a business meeting, user 102 performs an operation on portable device 104, such as sending a text message in reply to an incoming phone call. The portable device is in silent mode, which means that the portable device vibrates to alert the user of some events, such as an incoming phone call, a text message, a reminder for a meeting, etc.

Embodiments of the invention allow the portable device to be operated by a user and perform tasks (e.g., read an email, listen to a voicemail, send a text message or email, silence an alarm, etc. . . . ) without giving the device full attention. "Full attention" herein refers to removing the device from a pocket and operating the device with both hands while looking at the device. Audio-based speech recognition technology is making large headway, but in some situations it is still desirable to operate a device silently for privacy or courtesy reasons.

In one embodiment, mobile device 104 can vibrate 106 in different modes to convey different types of information to the user. For example, the device can perform intermittent vibrating pulses to indicate an incoming Short Message Service (SMS) message, or can vibrate with longer vibrating pulses to indicate an incoming call. Further, the number of vibrating pulses for an incoming call can change for certain callers, such as the callers in the contacts list of the portable device, or the callers in the favorites list. In one scenario, the first user in the favorites list causes a long vibrating pulse, the second in the favorites list causes two long vibrating pulses, etc. In this way, the user can be alerted of the identity of the caller just by the pattern of vibration 106 in portable device 104.

It should be noted that the embodiments relating to the vibration in FIG. 1 are exemplary. Other embodiments may utilize different vibrating patterns. The embodiments previously described should therefore not be interpreted to be exclusive or limiting, but rather exemplary or illustrative.

Some mobile phones include proximity sensors to detect when the mobile phone is placed next to the face of the user. In one embodiment, the proximity sensor is used to determine if the mobile phone has been in the pocket for some period of time. In this case, the mobile phone can change the unlock mechanism for the mobile phone to enable entering a command without having to look at the portable phone. For example, if an incoming text message is received, the mobile phone can unlock the touchscreen to allow the user to enter a command in "blind" mode, i.e., without looking at the phone. Similarly, a motion sensor can be used to determine if the portable device is in a moving car, and if so, allow the user to enter commands in "blind" mode. For description purposes, "blind" mode is referred to herein as a method of operation of an electronic device that does not require the user to receive visual input or cues to input commands on the electronic device. The device may still produce some visual outputs on the screen or a Light-Emitting Diode (LED), but these visual outputs are not required, nor intended, to guide the user through the option selection process in a program executing in the portable device or in a device connected to the portable device. Additionally, it should be understood that the principles of the invention can be applied in any electronic device with a touch-based input. Although embodiments of the invention are presented here for portable devices and mobile phones, the same principles can be applied to other devices, such as landline telephones, remote controls, gaming devices, etc.

Figure 2:
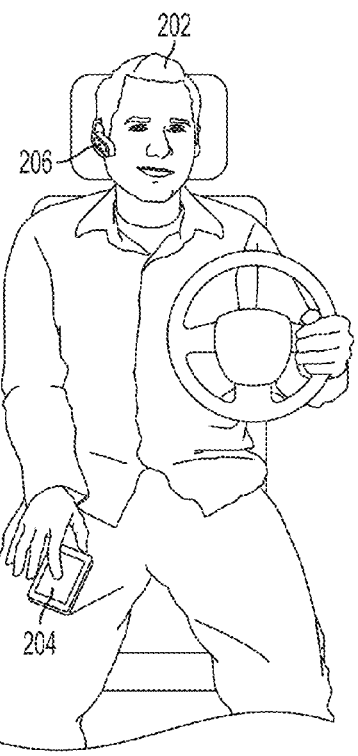
FIG. 2 depicts a driver entering a command while driving, according to one embodiment.

FIG. 2 depicts a driver entering a command while driving, according to one embodiment. As user 202 drives, a command is entered on portable device 204. Generally, the command is selected from a set of commands belonging to a menu tree, although other types of commands are also possible. The computer program executing on the device delivers sequentially the available options to the user in audible format via wireless headset 202. More details for selecting options from a menu are given below in reference to FIGS. 7A-7C.

As the options are read or spoken to user 202, a touch is kept on the touchscreen of portable device 204. When the user hears the desired option, the user lets go of the tap to select the desired option. The computer program in portable device 204 lets the user know that the input has been recognized by vibrating portable device 204 or by delivering an audible confirmation to the user via headset 202.

It should be noted that the user can touch anywhere on the touchscreen to enter the input, therefore the user does not require any visual cue to know where to tap the screen, and the user is not required to look at the portable device. This allows the user to keep the eyes on the road while driving. This does not mean that the touchscreen on the portable device has to be blank. The screen may include the options on the menu, or some other instruction, but the information on the screen is not intended to be required for the user to enter a command. The information on the screen is presented just in case the user decides to look at the touchscreen, but it is not a visual cue intended for the user in order to select an option from the menu. For example, several options in a mobile phone with a touchscreen may be presented to the user, and to select an option the user pushes a button on the touchscreen. This form of input requires the user to look at the screen to perform the entry.

Figure 3:
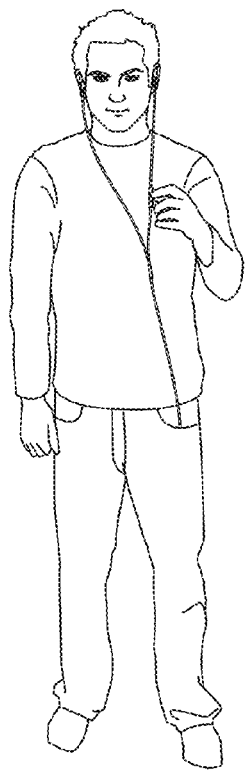
FIG. 3 depicts a user entering commands via a button on a headset in accordance with one embodiment of the invention.

FIG. 3 depicts a user entering commands via a button on a headset in accordance with one embodiment of the invention. In this embodiment, the user is "read" the options, as previously discussed for the wireless headset, but the options are delivered through a wired headset. One or more buttons on the headset can be used for selecting options from a menu, which are part of a tree of menu options. In one embodiment, the user holds a button pressed while receiving the options via the speakers in the headset. When the user hears the desired option, the user releases the button to perform the selection. In another embodiment, the user does not press a button while the options are read, and the user presses the button while the desired option is being read. In one embodiment, the entry button in the headset is one of the volume buttons available in some headsets.

It should be noted that a buffer of time may be provided to the user, to allow for the reaction time of the user. For example, if the user presses the button right at the beginning of the delivery of the option following the desired option, then the computer program will interpret that the user wants the "desired option," although the next option just started to be delivered. The buffer of time may be adjusted according to different factors, such as number of options, speed of delivery of the options, time required to deliver an option, etc. In one embodiment, a buffer of 500 ms is used, but other lengths of time are also possible.

Figure 4:
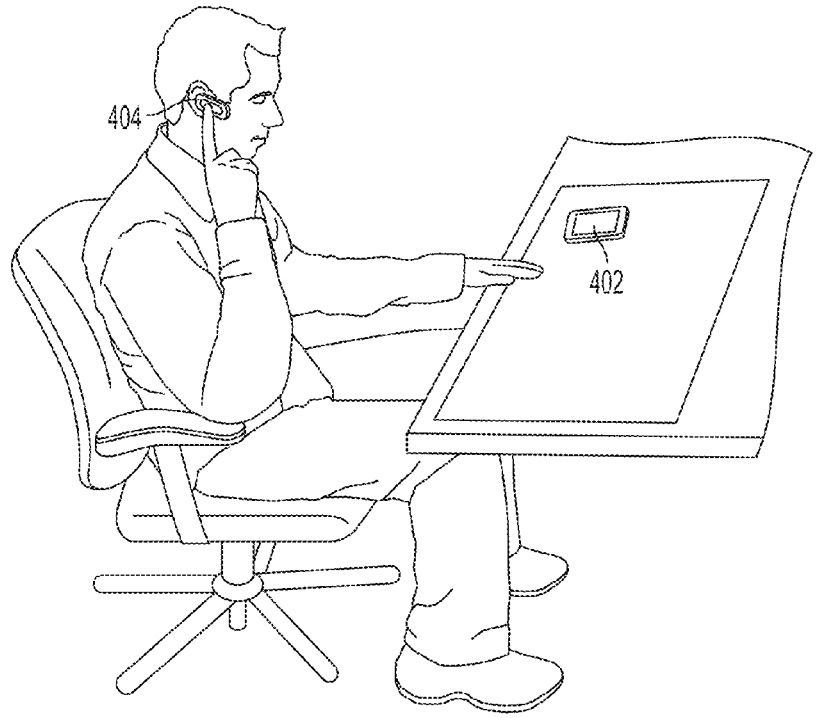
FIG. 4 illustrates a user entering a touch-based input on a wireless headset connected to an electronic device, according to one embodiment.

FIG. 4 illustrates a user entering a touch-based input on a wireless headset connected to an electronic device, according to one embodiment. Headset 404 communicates wirelessly with portable device 402. The computer program in portable device 402 delivers the menu options to the user via the audio output of wireless headset 404. Wireless headset 404 has at least one touch-based input, such as a button, a touch sensor, a touchscreen, etc. In one embodiment, wireless headset 404 has also vibrating capabilities to provide vibrating feedback to the user.

In another embodiment, the user taps wireless headset 404 to indicate that the user is ready to enter into "blind" mode. The computer program in portable device 402 then determines the available options to the user, depending on the state of the computer program. For example, if portable device just received a text message, the computer program will select a menu of available options related to the text message, such as read the text message, reply, forward, read envelope, etc.

While the available options are delivered, the user selects an option by removing the tap from wireless headset 404. This allows the user to perform operations on the portable device without having to handle or look at the portable device. Since the user only has to tap the wireless headset on her ear, the user can operate the portable device discretely so other users around will not notice that the user is operating the phone. For example, a user may be alerted that a new text message has been received, either by noticing a vibration or a sound from the portable device, or by receiving audio or tactile input from the headset. The user may select the option "read the text message" and the portable device will use text-to-voice conversion to deliver the message to the user through the headset. Afterwards, if the user wishes to send a reply using the "blind" mode, the user selects the option "reply." As described in more detail below in reference to FIGS. 7A-7C, the user is given a new set of available options after entering a choice, according to the choice selected and the tree of menu options in the computer program.

Figure 5:
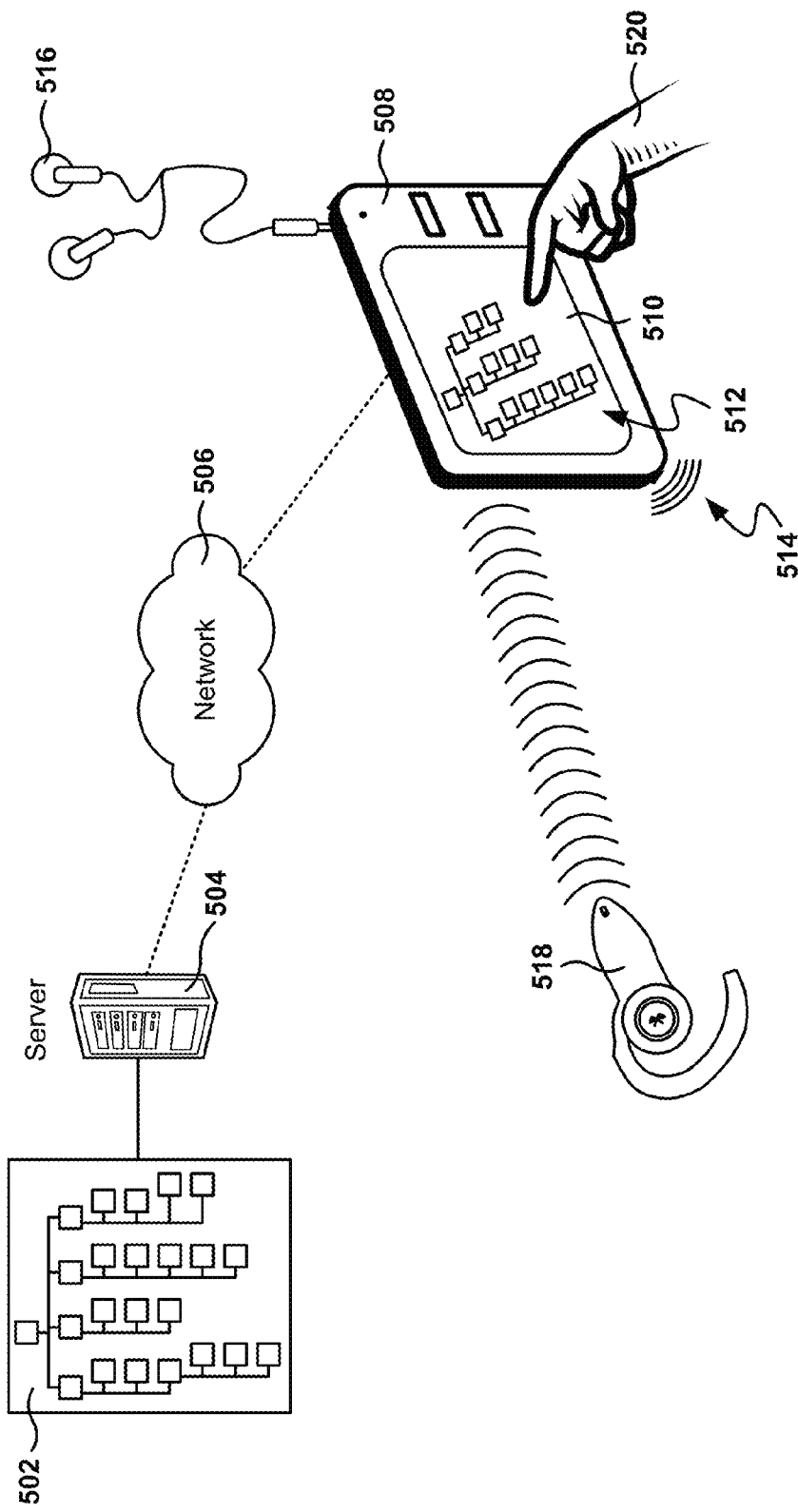
FIG. 5 is a simplified schematic diagram of a computer system for implementing embodiments of the present invention.

FIG. 5 is a simplified schematic diagram of a computer system for implementing embodiments of the present invention. Portable device 508 executes computer program 512 with multiple user-selectable options, where some or all of the options are organized in a tree of menu options. The user traverses the tree of menu options by choosing the options offered at a given level. After one option is selected, a specific action is performed by the computer program (e.g., read an email) or the computer program traverses the tree to select a different node in the tree. The new node in the tree has a new set of available options that are presented to the user.

In another embodiment, computer program 502, also including a menu of options, resides in remote server 504 which is connected to portable device 508 through network 506. The user is able to traverse the menu tree of computer program 502 in the remote server by entering commands in portable device 508 which are transmitted to server 504. In this case, the portable device acts as an input device using touch-based entries.

It should be noted that the embodiments illustrated herein are exemplary ways of selecting options in a computer program. Other embodiments may utilize different organization for the options. For example, the menu of options may not be organized in a tree-like structure or the available options may be a combination of options to be executed in the portable device or remote server 504. Additionally, some global options that are not considered part of the tree, such as "go back,", "go to main menu," "end program," etc. may always be available. Embodiments illustrated herein are presented using tree-like menu options, but these embodiments should therefore not be interpreted to be exclusive or limiting, but rather exemplary or illustrative.

In one embodiment, touchscreen 510 allows the user to make menu selections by tapping touchscreen 510. However, other touch-based inputs are also possible, such as buttons on headset 516, a button on wireless headset 518, etc. Wireless headset 518 is connected to portable device 508 through a wireless connection such as Bluetooth, infrared, WiFi, etc. Portable device 508 also includes a vibro-tactile feedback module that provides feedback to the user by vibrating the portable device using internal motors. More details on the architecture of portable device 508 are given below in reference to FIG. 10.

Figure 6A:
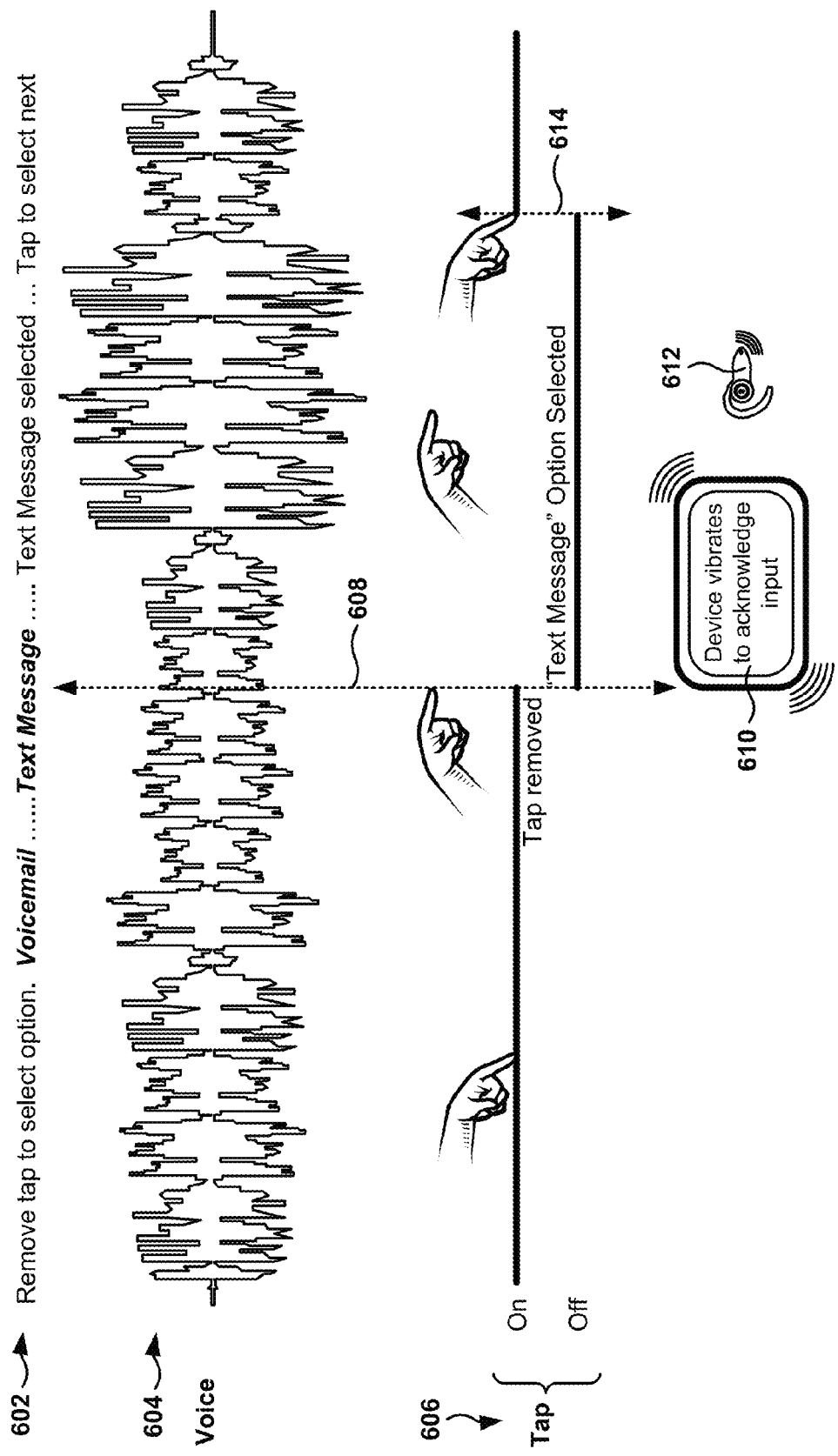
FIGS. 6A-6B provide graphical representations of the entry of touch-based commands based on audio output, according to one embodiment.
Figure 6B:
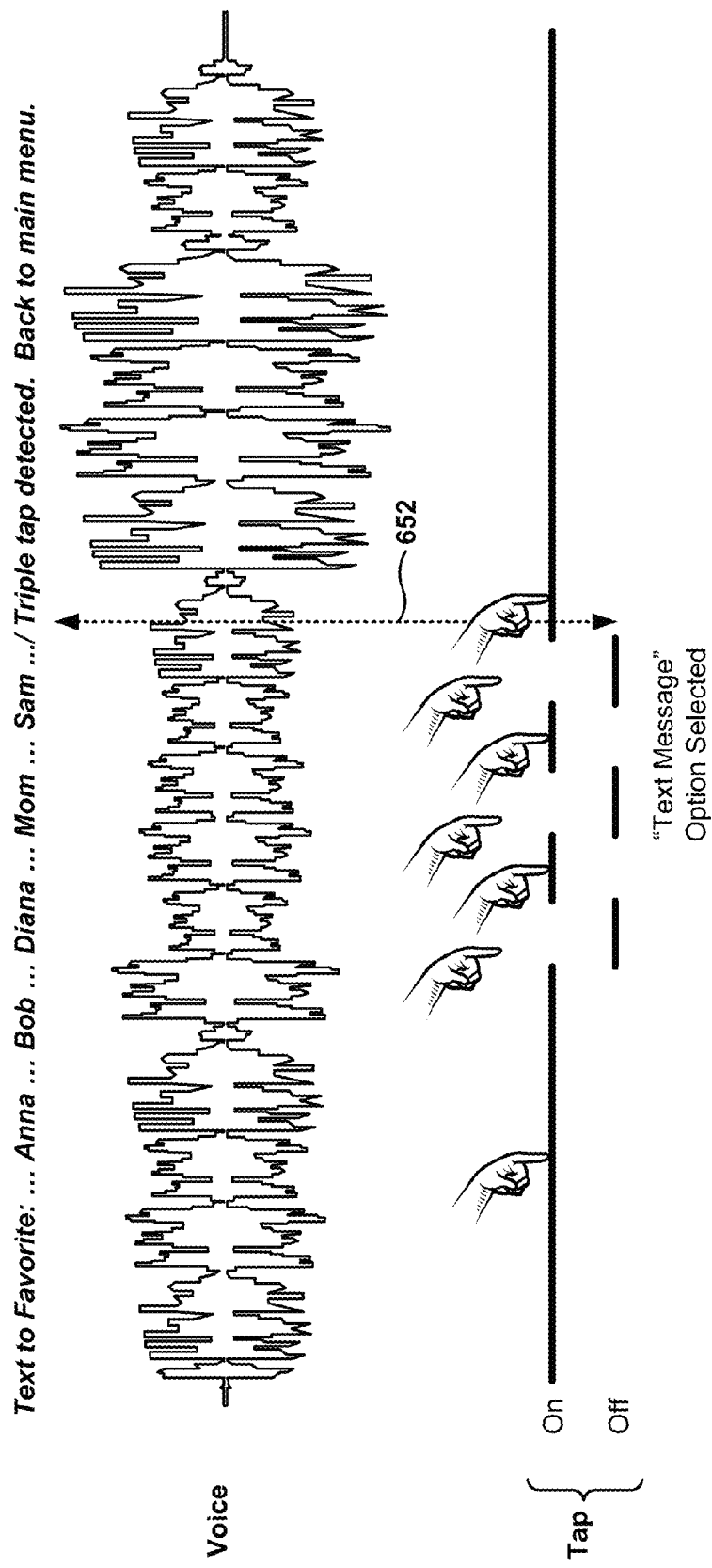

FIGS. 6A-6B provide graphical representations of the entry of touch-based commands based on audio output, according to one embodiment. In one embodiment, the input system is touch-based and must be operable without requiring the user to look at the device. As previously discussed, the display on the portable device may show a message, but the user is not required to look at the message or be aware of the message in order to enter input and select options. Because of this, the input is one-dimensional, described as "touch over time". At any point during tree navigation and task execution, the user provides input into the system by either touching or not touching the device at any moment in time. The system is navigable using this method.

Different embodiments may use different implementations of "touch over time," such as allowing multi-tapping, different sequences of multi-taps to enter different commands, differentiating between "short" and "long" tap pulses, etc. The person skilled in the art will readily appreciate that many combinations of inputs are available using "touch over time."

In one embodiment, the user initiates interaction by entering a predefined touch-based input, such as holding a finger down on the device's touch surface for a few seconds, entering an explicit gesture such as "coarse tapping" (rapid touching and releasing without any precision timing associated with the tapping), etc. Of course, other initialization methods can be defined to start the interaction. In some cases, the interaction may be initiated by the portable device, for example by detecting an incoming call and entering the user in "touch over time" or "blind" mode automatically. In this case, the user is given the option to enter another form of input mode, such as pressing a button on the device to unlock the device.

In the scenario shown in FIG. 6A, a user is instructed of options available 602 via voice output 604 to the remote headset 612. In this case, the voice output delivers the available options from a main menu of the mobile phone. The tap 606 status can be on or off, meaning that the user is holding a tap on the portable device or the user is not holding the tap on the portable device. In FIG. 6A the presence of a tap is symbolized by the user's finger touching the "On" option.

The voice output first instructs the user to "remove tap to select an option," followed by the delivery of the different options "Voicemail, Text Message," etc. As the option "Text Message" is being read to the user, the user removes 608 the tap from the portable device to flag that the user selects the option being read. In one embodiment a minimum amount of buffer time (e.g., 500 ms) with the tap off is required for the program to determine that the option has been selected. This buffer of time allows the program to differentiate between a tap-on/tap-off input and an input of one or more taps on the portable device. Thus, if the program detects a tap off followed by a tap before the end of the buffer time, the program will determine that a pulse tap has been entered instead of determining that the option being read has been selected. This feature enables the simultaneous use of global options, such as "go back" or "go to main menu," with the tap-on/tap-off input.

The voice traverses the options at each horizontal level of the tree, and the current option is descended into if the user touches the surface in a system-defined window of time while the option is spoken or after the option is spoken. The option selected will carry the user to a new point in the tree or will perform the action defined by the option selected. If the option selected takes the computer program to a new point in the tree, then the computer program determines the new set of available options and the process starts again by cueing the user to tap the device again 614. Once the user taps the screen, the new options are spoken to the user.

In one embodiment, portable device 610 or wireless headset 612 give vibration feedback to the user (e.g., a 250 ms vibration) to acknowledge that the user input has been captured by the computer program.

FIG. 6B depicts a scenario where a "triple tap" is detected by the computer program, according to one embodiment. The computer program includes a global option to "go back to main menu" to be detected when the user performs three quick taps on the touchscreen. It should be appreciated that although "go back to main menu" is not one of the options spoken to the user, this option "go back to main menu" is considered one of the available options to the user anytime the user is traversing the menu tree.

FIG. 6B captures the scenario when the program is prompting the user to select one of the favorite contacts in order to send a text message to the selected contact. As the program speaks the favorites "Anna, Bob, etc.," the user performs a triple tap 652. The computer program detects the triple tap 652 and notifies the user that the triple tap has been selected and the user will then be taken to the main menu.

Figure 7A:
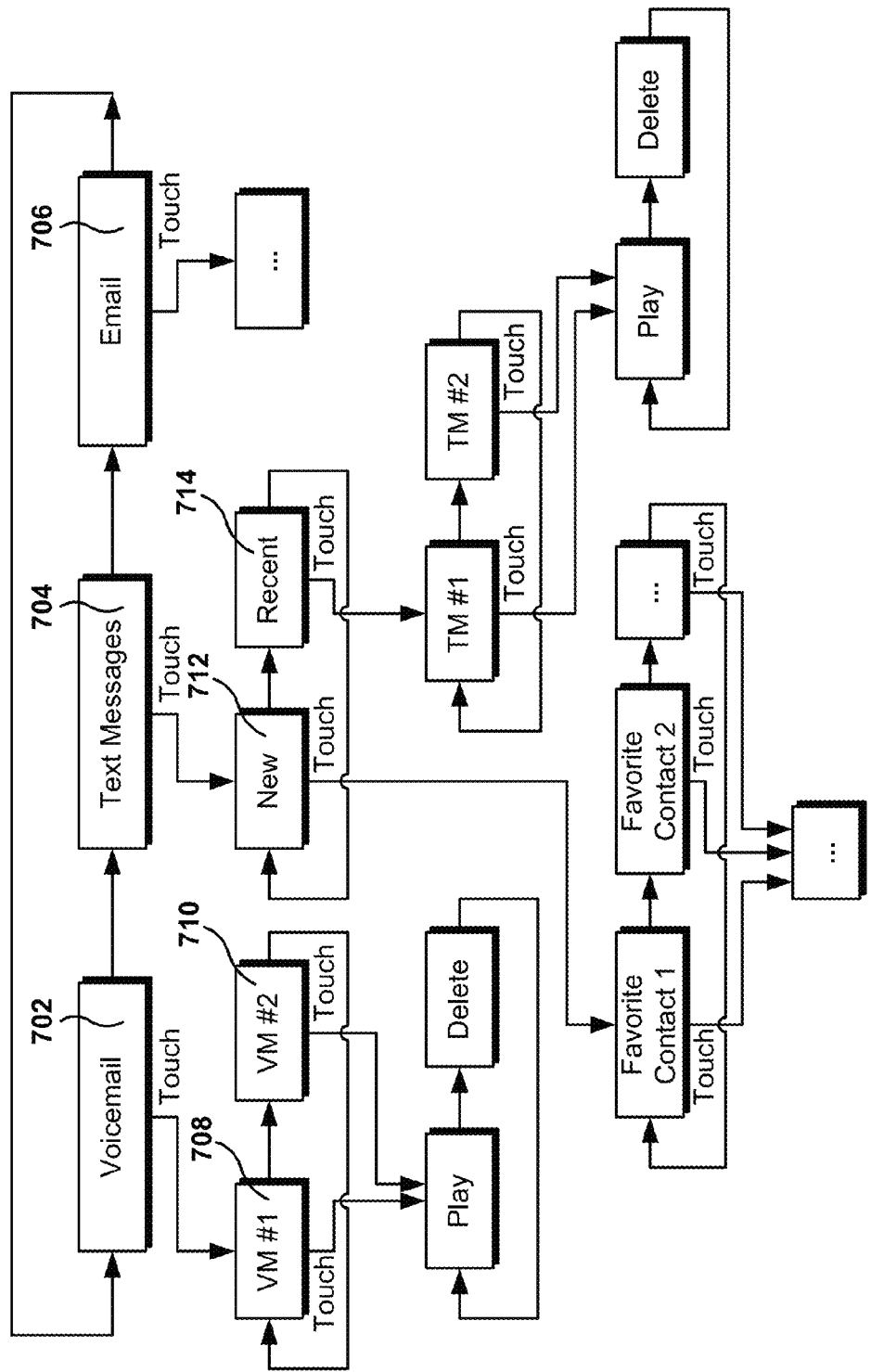
FIGS. 7A-7C illustrate the navigation of a menu tree, according to one embodiment.
Figure 7B:
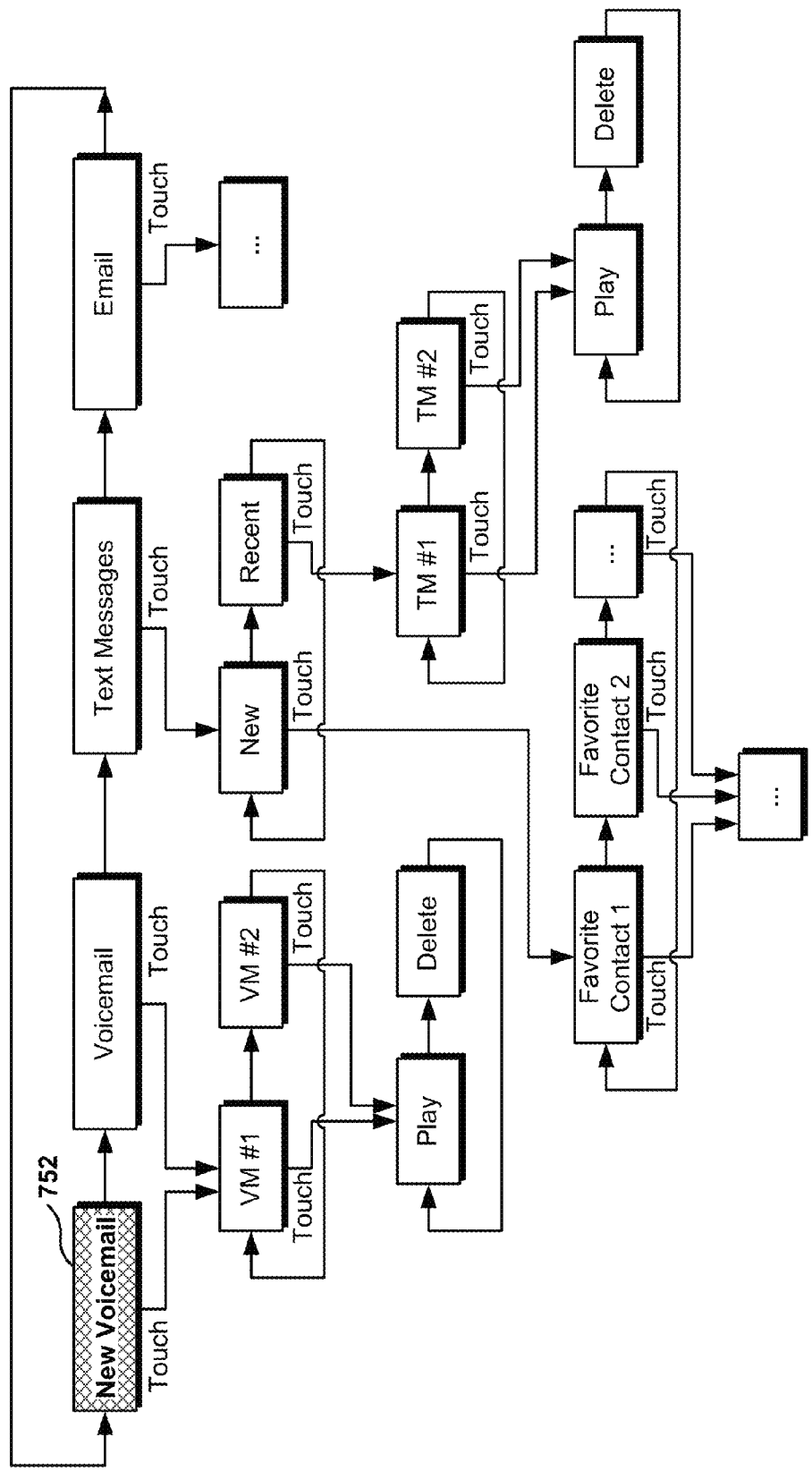
Figure 7C:
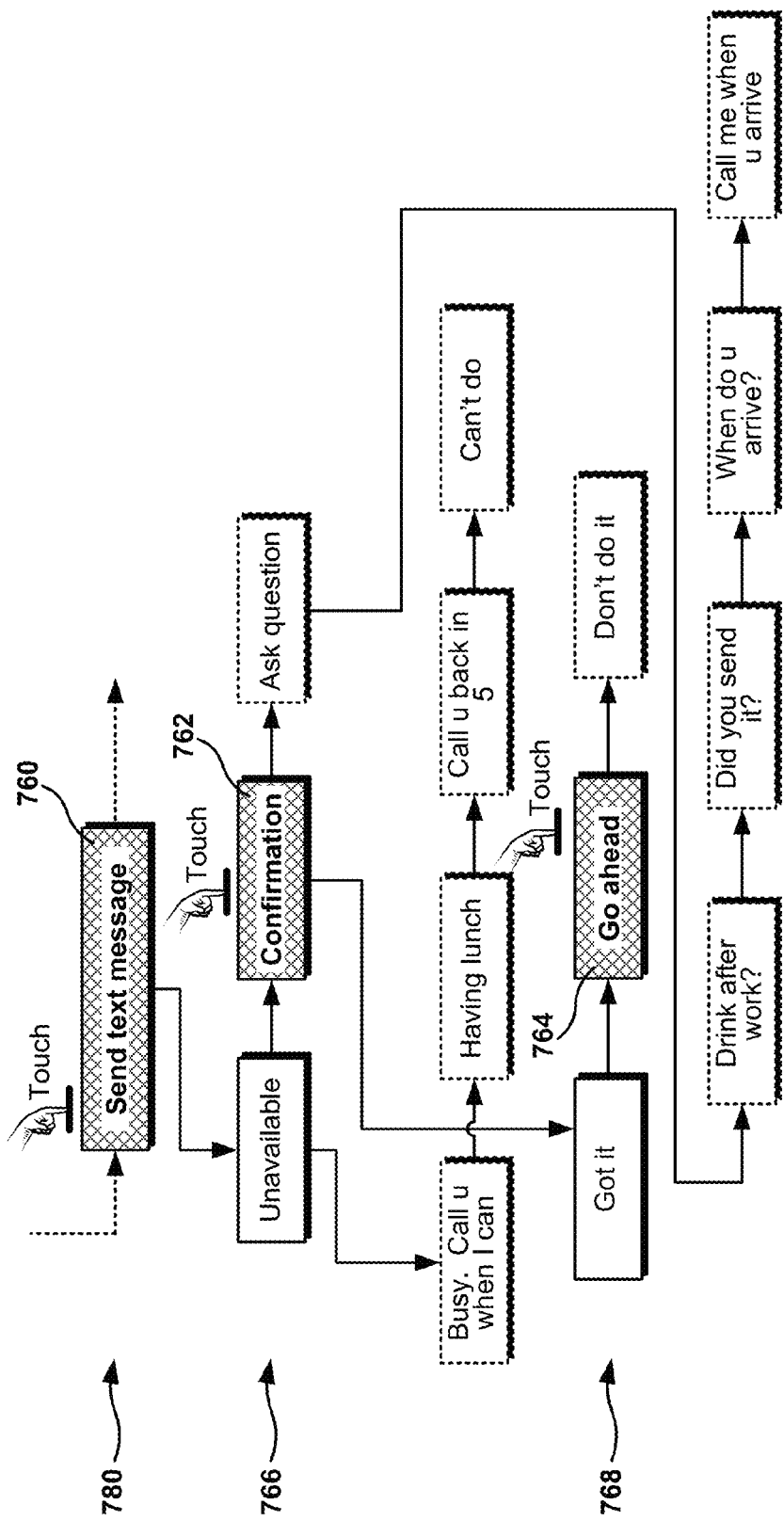

FIGS. 7A-7C illustrate the navigation of a menu tree, according to one embodiment. Traditional automated phone menu systems form "trees" of menu selections that the user descends via touchtone button presses, ultimately arriving at a "task" (customer service, bank account transaction, credit card payment, etc. . . . ) that is performed by the computer program. FIG. 7A depicts one example of a menu tree. At the top level of the tree referred to as the main menu, several options are available such as Voicemail 702, Text Messages 704, and Email 706. In this case, any of the options in the main menu take the user to a new level with different options related to the selection performed. It should be noted that, in some embodiments, there can be a mixture of options that take the user to more options and options that will cause an actual task to be executed.

In the embodiment of FIG. 7A, the available options are delivered to the user in audible format to the user in a circular manner, that is, if the user has not selected an option after the last choice has been delivered, the computer program will start delivering the options again to the user. In other embodiments, the options may not be repeated, and the computer program may, for example, take the user back to the main menu if an option has not been selected.

When option "Voicemail" 702 is selected, then the computer delivers options 708 and 710 to listen to Voicemail; if the option "Text Messages" 704 is selected, then the new options are "New" 712 to create a new text message, and "Recent" 714 to check text messages sent recently; etc.

In one embodiment, the topology of the action tree can change dynamically given the state of the device at the time of activation, as illustrated in FIG. 7B. If the user has urgent pending data, such as a voicemail or a text message, the tree is dynamically reconfigured so as to make accessing the pending data as direct and immediate as possible. In the scenario captured in FIG. 7B, the user has a new unheard voicemail. The presence of this new voicemail triggers a dynamic reconfiguration of the tree to add option "New Voicemail" 752 to the main menu. This way the user can quickly and easily react to urgent pending data and retrieve the data with minimal input and delay.

When the computer program delivers the option from the main menu, the new option "New Voicemail" 752 is delivered first, allowing the user to jump right into new voicemail without having to listen to other options in the main menu and also allowing to skip an operation because the new voicemail will be delivered right after the "New Voicemail" 752 is selected.

Further, since navigating the tree is based on one-dimensional inputs, it may take a relatively long time for the user to reach the desired option since the user has to listen to all the options previous to the option selected, which may occur at several levels while parsing the menu tree. One embodiment allows the user to configure the tree such that her most common tasks are delivered earlier than other less common options. In one embodiment, this is performed via a Graphical User Interface (GUI) that represents each option with an icon and allows the user to move the icons around, such as by dragging and dropping the icon ahead or behind other icons. In another embodiment, the user is presented with all the options at a given level and the user reconfigures the options by moving them towards the beginning or the back of the option list.

FIG. 7C captures another scenario that illustrates how a user can quickly and discretely send a text message using one embodiment of the invention. The user has previously selected in the main menu the option for "Text Messages" and the computer program goes to level 780 in the menu tree. As the options corresponding to level 780 are spoken to the user, the user provides a touch-based input, as previously described, to select option "Send text message" 760. As a result, the computer program travels to level 766 associated with option 760. Level 766 includes categories of pre-defined messages that the user can select in response to an incoming text message. While the options of level 766 are being delivered, the user performs another touch-based input to select option "Confirmation" 762, and the menu tree is traversed again to go to level 768 that contains several messages related to "Confirmation."

In level 768, the user selects option 764 to text message "Go ahead" back to the caller. The user selects this option just by providing three easy touch-based inputs and the user is able to quickly send a text message to the caller without having to look at the portable device.

Figure 8A:
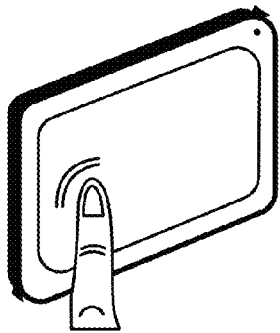
FIGS. 8A-8F illustrate several embodiments for entering touch-based inputs.
Figure 8B:
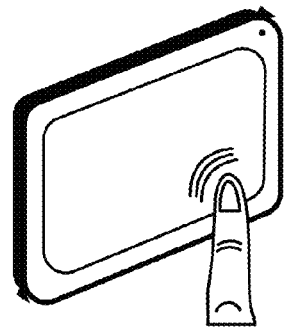

FIGS. 8A-8F illustrate several embodiments for entering touch-based inputs. In FIG. 8A, the user enters the touch-based input by tapping the touchscreen of the portable device. The user can tap anywhere on the screen because it is not required that the user looks at the screen to make a selection. FIG. 8B illustrates a user performing an input by doing a triple tap on the touchscreen. As previously discussed in reference to the embodiment of FIG. 6B, the user can use the triple tap to select a global option, but other options are also possible.

Figure 8C:
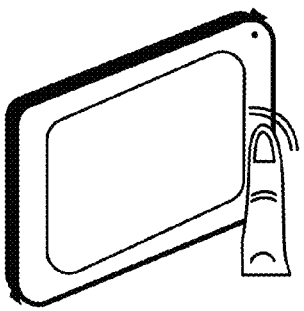
Figure 8D:
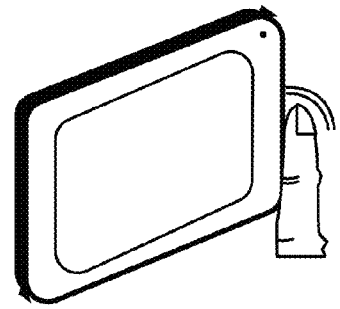

The touchscreen is not the only possible way to enter a touch-based input. For example, the user can enter a touch-based input or a "touch over time" input by pressing a button on the portable device. Also, if the portable device has sensing capabilities beyond the touchscreen, then the user can tap anywhere on the portable device, as shown in FIG. 8C, where the user is tapping on the side of the portable device surrounding the touchscreen. Additionally, FIG. 8D illustrates an embodiment for entering a touch-based input by touching the side of the portable device.

Figure 8E:
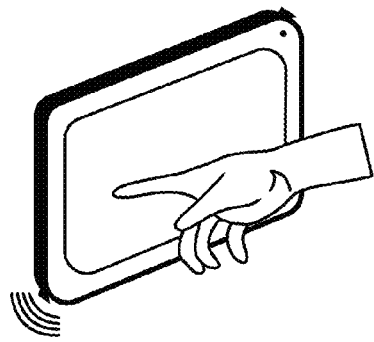
Figure 8F:
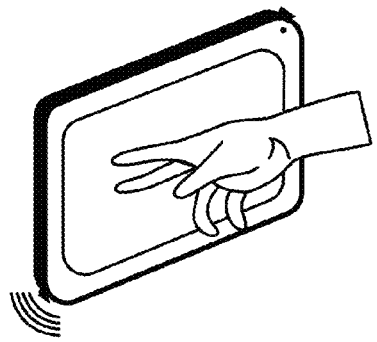

Many of today's portable devices have touchscreens that can sense multiple touches. This feature is used to perform operations such as zooming in or out the display. Multi-touch can be used to enable new combinations for touch inputs. For example, FIG. 8E shows the user with the finger on the touchscreen while a set of options is being delivered. When the user hears the option desired, the user selects the option by touching the touchscreen with a second finger while maintaining the touch with the first finger, as seen in FIG. 8F.

In other embodiment, the double touch is reserved for global options, while the options available in the menu tree are selected with just one finger. For example, if the system is delivering options to the user, the double touch is interpreted as a "go back command," or as a "repeat options again starting from the first option." In yet another embodiment, the second touch is used to speed up the delivery of options, for example, a double touch means skip reading the current option and start delivering the next option. The person skilled in the art will readily appreciate the added flexibility of the second touch and how to create new combinations of inputs for faster traversing of the menu tree.

FIGS. 9A-9F illustrate different embodiments for tapping a device or a peripheral connected to the device. In one embodiment, while the computer program is on blind mode, the portable device may produce visual outputs, although these outputs are not intended as a way to help the user navigate the menu trees and the user is not required to look at the portable device to perform selections.

Figure 9A:
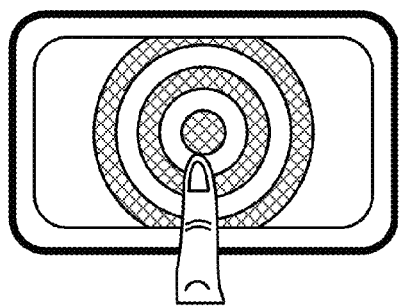
FIGS. 9A-9F illustrate different embodiments for tapping a device or a peripheral connected to the device.
Figure 9B:
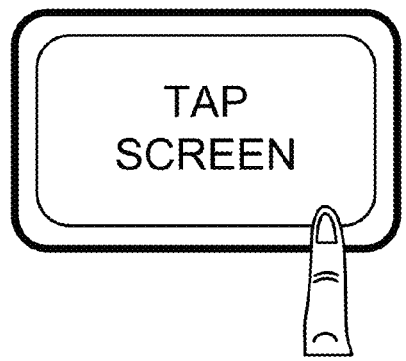

For example, FIG. 9A shows an iconic target on the screen to indicate that a touch on the screen is expected. Of course, although a target is presented, the user is not required to press in the center of the target, as any part of the touchscreen will do. FIG. 9B shows a plain text message to indicate that touching the screen is expected as the input mode. In this case the message "Tap Screen" is displayed, but other similar messages can be provided.

Figure 9C:
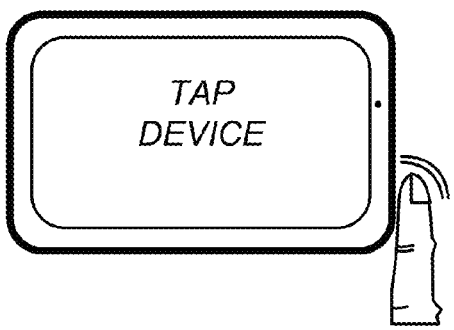
Figure 9D:
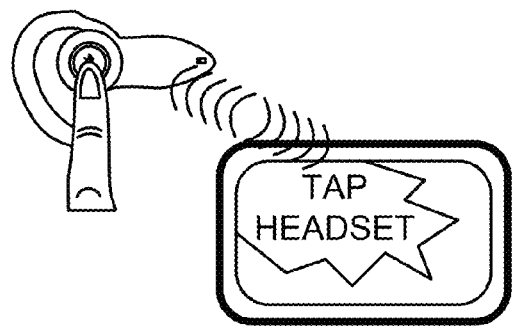
Figure 9E:
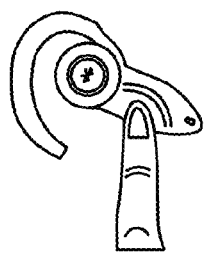
Figure 9F:
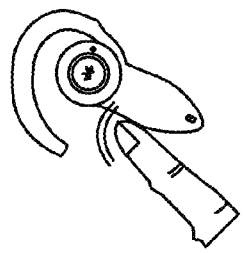

FIG. 9C illustrates a message to "Tap Device" such that the user can tap anywhere on the device, including the touchscreen, to perform the touch-based input. The touch-based input can also be performed on a peripheral or device connected to the portable device, such as a wired headset, a wireless headset, a remote control, etc. FIG. 9D shows a message to "Tap Headset" in the touchscreen that indicates that the user can perform the touch on the wireless headset.

The peripherals can also be touched in multiple ways, such as on the side of the wireless headset in FIG. 9C, or the underside of the wireless headset, as illustrated in FIG. 9D. Of course, multiple modes of touch-based input can be performed on the wireless headset, as were previously discussed for the portable device. This way, an input on the wireless headset can be performed by maintaining a touch on the headset, double tapping the headset, etc.

There are multiple Bluetooth profiles for using the wireless interface specification for Bluetooth-based communication between devices. In order to use Bluetooth technology, a device must be compatible with the subset of Bluetooth profiles necessary to use the desired services. Bluetooth headphones, especially the more advanced models, often come with a microphone and support for the Headset (HSP), Hands-Free (HFP) and Audio/Video Remote Control (AVRCP) profiles. Embodiments of the invention can accommodate different types of Bluetooth profiles in order to deliver audio output to the user or, in some cases, to enter commands at the headset for transmission to the portable device.

Further, a touch-based input can be performed on an object not in electrical communication with the portable device. For example, the user can tap a table and the tapping can be captured by a camera, which is part of the portable device or in communication with the portable device, and the portable device uses image analysis to determine when the tapping takes place.

Figure 10:
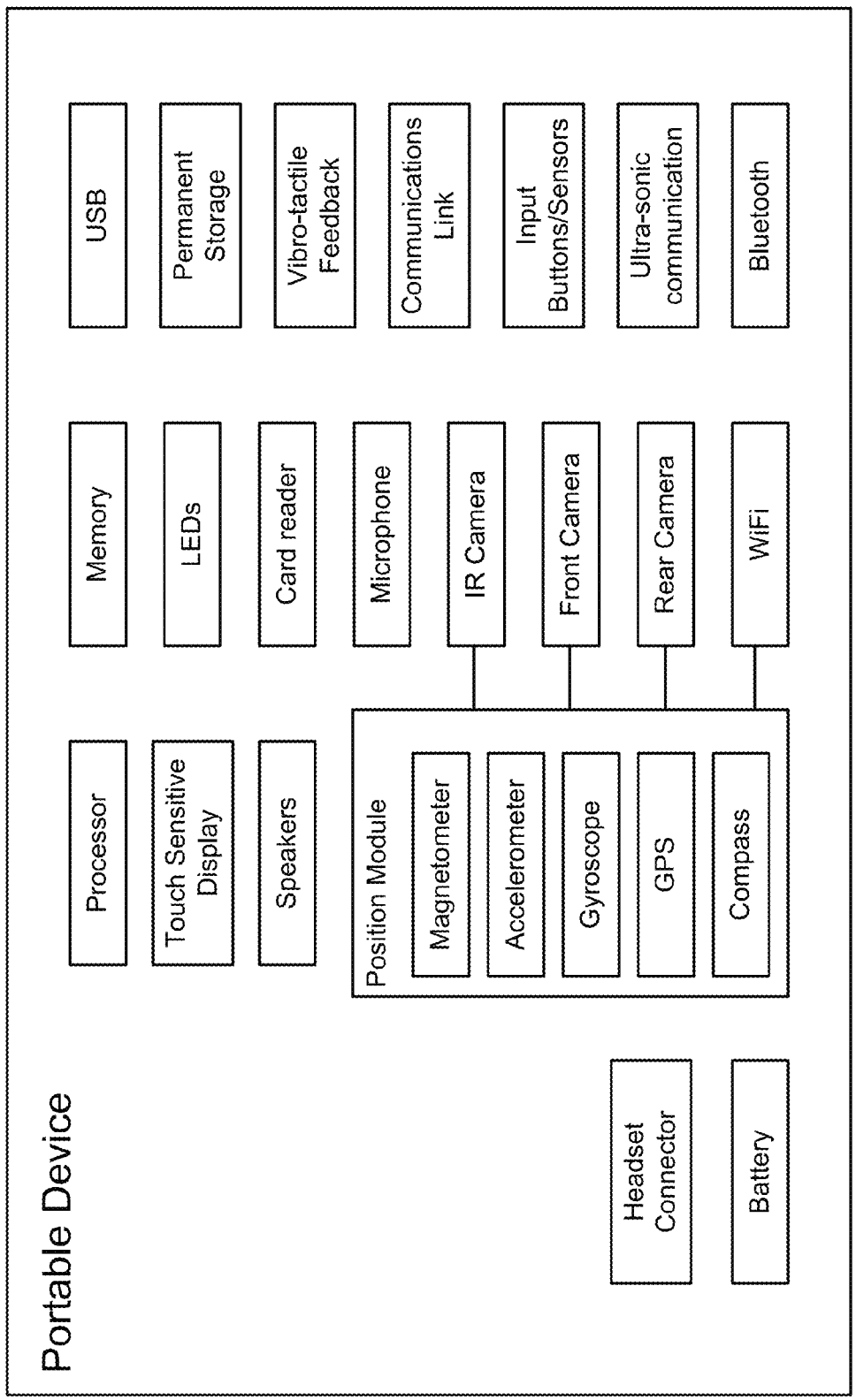
FIG. 10 illustrates the architecture of a device that may be used to implement embodiments of the invention.

FIG. 10 illustrates the architecture of a device that may be used to implement embodiments of the invention. The portable device is a computing device and include typical modules present in a computing device, such as a processor, memory (RAM, ROM, etc.), battery or other power source, and permanent storage (such as a hard disk). Communication modules allow the portable device to exchange information with other portable devices, other computers, servers, etc. The communication modules include a Universal Serial Bus (USB) connector, a communications link (such as Ethernet), ultrasonic communication, Bluetooth, and WiFi.

Input modules include input buttons and sensors, microphone, touch sensitive screen, cameras (front facing, rear facing, depth camera), headset connector, and card reader. Other input/output devices, such as a keyboard or a mouse, can also be connected to the portable device via communications link, such as USB or Bluetooth. Output modules include a display (with a touch-sensitive screen), Light-Emitting Diodes (LED), vibro-tactile feedback, and speakers. Other output devices can also connect to the portable device via the communication modules, such as a wireless headset.

Information from different devices can be used by the Position Module to calculate the position of the portable device. These modules include a magnetometer, an accelerometer, a gyroscope, a Global Positioning System (GPS), and a compass. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

It should be appreciated that the embodiment illustrated in FIG. 10 is an exemplary implementation of a portable device. Other embodiments may utilize different modules, a subset of the modules, or assign related tasks to different modules. The embodiment illustrated in FIG. 10 should therefore not be interpreted to be exclusive or limiting, but rather exemplary or illustrative.

Figure 11:
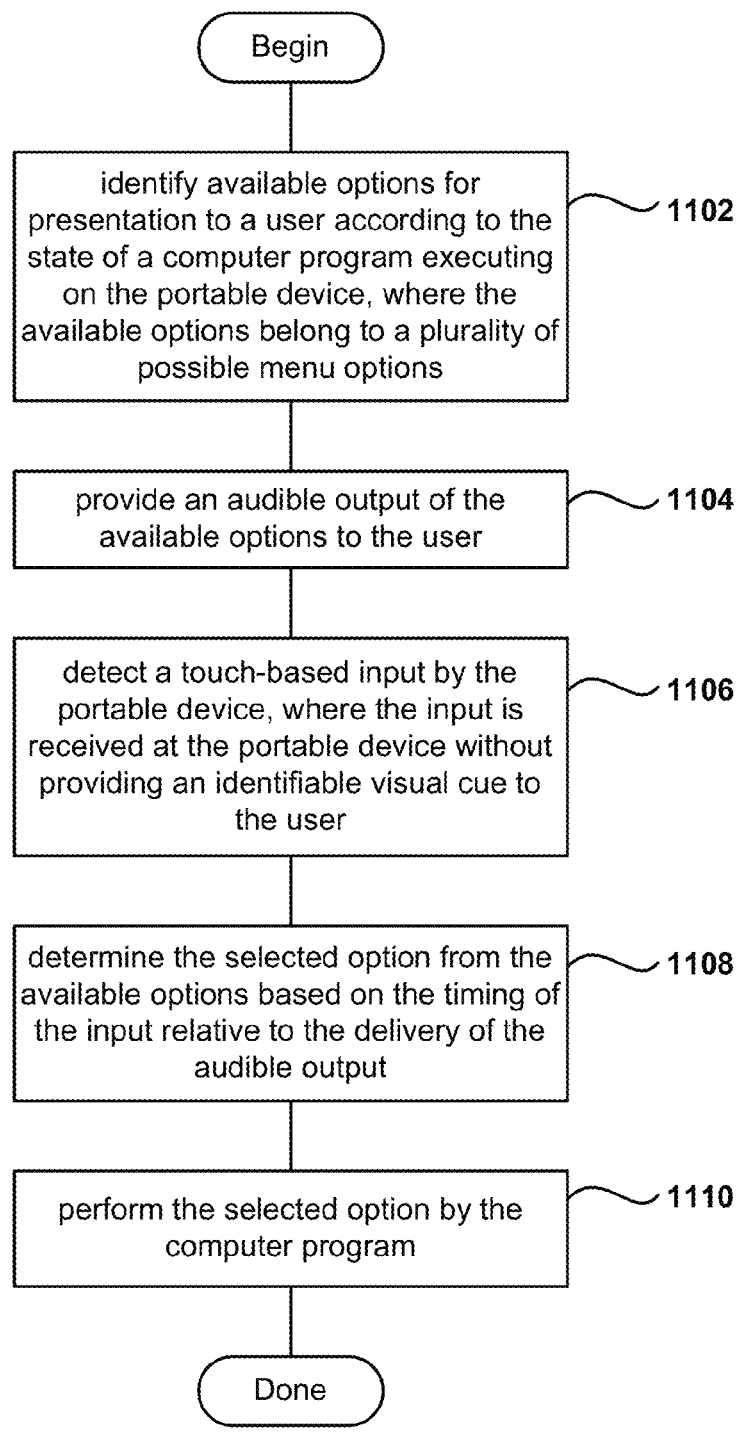
FIG. 11 shows the process flow for controlling a portable device in accordance with one embodiment of the invention.

FIG. 11 shows the process flow for controlling a portable device in accordance with one embodiment of the invention. In operation 1102, the method identifies the available options for presentation to a user according to a state of a computer program executing on the portable device. The available options belong to a plurality of possible menu options, such as, for example, the options shown in FIGS. 7A-7C. From operation 1102, the method flows to operation 1104, where an audible output of the available options is provided to the user.

Further, in operation 1106 the portable device detects a touch-base input, where the input is received at the portable device without providing an identifiable visual cue to the user. After operation 1106, operation 1108 is performed to determine a selected option from the available options. The determination of which option is selected is based on the timing of the input relative to the audible output. In operation 1110, the computer program performs the selected option.

Figure 12:
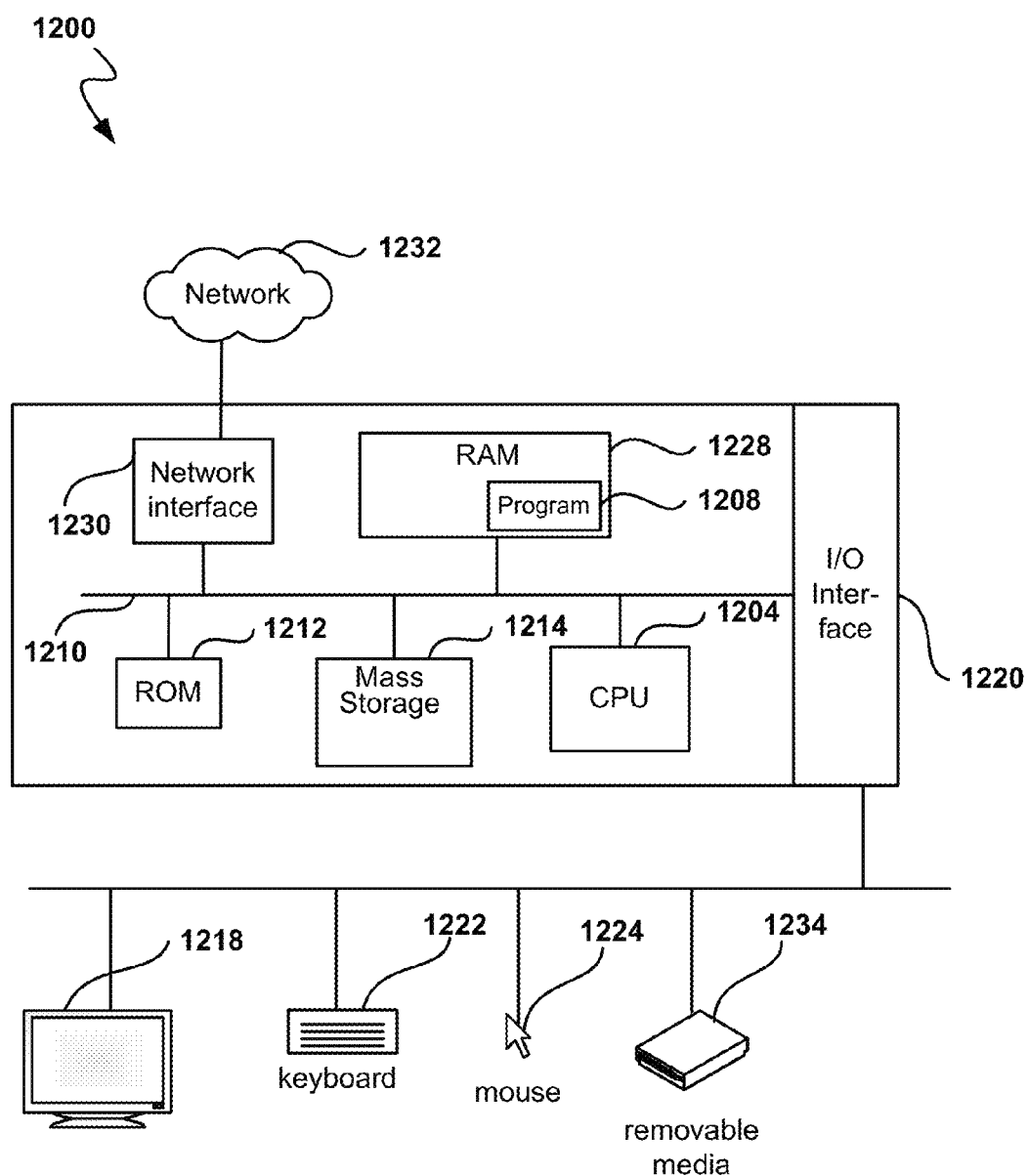
FIG. 12 depicts a computer environment for implementing embodiments of the invention.

FIG. 12 depicts a computer environment for implementing embodiments of the invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1204, which is coupled through bus 1210 to random access memory (RAM) 1206, read-only memory (ROM) 1212, and mass storage device 1214. Title generating program 1208 resides in random access memory (RAM) 1206, but can also reside in mass storage 1214.

Mass storage device 1214 represents a persistent data storage device such as a floppy disc drive or a fixed disc drive, which may be local or remote. Network interface 1230 provides connections via network 1232, allowing communications with other devices. It should be appreciated that CPU 1204 may be embodied in a general-purpose processor, a special purpose processor, or a specially programmed logic device. Input/Output (I/O) interface provides communication with different peripherals and is connected with CPU 1204, RAM 1206, ROM 1212, and mass storage device 1214, through bus 1210. Sample peripherals include display 1218, keyboard 1222, cursor control 1224, removable media device 1234, etc.

Display 1218 is configured to display the user interfaces described herein, such as browser 102 from FIG. 1. Keyboard 1222, cursor control 1224, removable media device 1234, and other peripherals are coupled to I/O interface 1220 in order to communicate information in command selections to CPU 1204. It should be appreciated that data to and from external devices may be communicated through I/O interface 1220. The invention can also be practiced in distributed computing environments where tasks are performed by remote processing devices that are linked through a wire-based or wireless network.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling a portable device, the method comprising:

identifying available options for presentation to a user according to a state of a computer program executing on the portable device, the available options belonging to a plurality of possible menu options;

detecting a sustained touch on a touchscreen of the portable device, the detecting including sensing a lack of touch on the touchscreen and sensing, after the lack of touch, the sustained touch anywhere in the touchscreen;

reciting the available options to the user via an audible output in response to the sustained touch, wherein the audible output is a verbal delivery of the available options;

detecting an end to the sustained touch while reciting the available options;

selecting one of the available options that was recited to the user when the end to the sustained touch was detected, the end to the sustained touch defining an input for the portable device, the input received at the portable device without providing an identifiable visual cue to the user, wherein the selected available option is selected based on a timing of the end to the sustained touch relative to the audible output; and performing the selected available option by the computer program.

2. The method as recited in claim 1, wherein the available options include:

a set of options corresponding to a level in a tree of options;
a global option to go to a main menu; and
a go-back option to return to a last set of options.

3. The method as recited in claim 2, wherein the audible output includes the set of options corresponding to a level in the tree of options.

4. The method as recited in claim 1 further including:

detecting a second sustained touch on a wireless headset wirelessly connected to the portable device;
providing second available options in response to the second sustained touch; and
detecting an end to the sustained touch in the wireless headset to determine a second selected option.

5. The method as recited in claim 1, further including:

determining a new set of available options after performing the selected available option, wherein the selected available option is part of a menu tree and the new set of available options are defined in the menu tree for the selected available option.

6. The method as recited in claim 1, wherein the audible output is a verbal delivery of the available options.

7. The method as recited in claim 1, further including:

detecting a second touch by the user on a table to define a second input for the portable device, the detecting of the second touch being performed by image analysis of an image taken by a camera in the portable device.

8. A method for controlling a portable device, the method comprising:

identifying available options for presentation to a user according to a state of a computer program executing on the portable device, the available options belonging to a plurality of possible menu options;

detecting a sustained touch on a touchscreen of the portable device, the detecting including sensing a lack of touch on the touchscreen and sensing, after the lack of touch, the sustained touch anywhere in the touchscreen;

reciting the available options to the user by vibrating the portable device in response to the sustained touch to cue the user for selecting one of the available options, wherein a different vibration pattern is defined for each available option;

detecting an end to the sustained touch while reciting the available options;

selecting one of the available options that was recited to the user when the end to the sustained touch was detected, the end to the sustained touch defining a user input received at the portable device without providing an identifiable visual cue to the user, wherein the selected available option is selected based on a timing of the end to the sustained touch relative to the vibrating of the portable device; and performing the selected available option by the computer program.

9. The method as recited in claim 8, wherein the different vibration pattern includes a number of vibration pulses, wherein each available option is associated with a different number of vibration pulses.

10. The method as recited in claim 8, further including:

vibrating the portable device with a unique vibrating pattern to indicate that the option was selected.

11. A method for controlling a portable device, the method comprising:

identifying available options for presentation to a user according to a state of a computer program executing on the portable device, the available options belonging to a plurality of possible menu options;

detecting a first touch that is sustained on a touchscreen of the portable device, the detecting including sensing a lack of touch on the touchscreen and sensing, after the lack of touch, the sustained touch anywhere in the touchscreen;

reciting the available options to the user via an audible output in response to the first touch, wherein the audible output is a verbal delivery of the available options;

detecting a second touch on the touchscreen while the first touch is sustained on the touchscreen and while reciting the available options;

selecting one of the available options that was recited to the user when the second touch was detected, the first touch and the second touch defining an input for the portable device, the input received at the portable device without providing an identifiable visual cue to the user, wherein the selected available option is selected based on a timing of the second touch relative to the audible output; and performing the selected available option by the computer program.

12. The method as recited in claim 11, further including:

sensing an end to the first touch; and
determining a new set of available options.

* * * * *